United States Patent

Mancioli

[15] 3,670,641

[45] June 20, 1972

[54] BEVERAGE INFUSION APPARATUS, FOR EXAMPLE COFFEE

[72] Inventor: Luciano Mancioli, Localita Il Cartolaro, Montelupo, Italy

[22] Filed: Dec. 24, 1970

[21] Appl. No.: 101,271

[30] Foreign Application Priority Data

Dec. 31, 1969 Italy ........................................... 4915

[52] U.S. Cl. .................................................. 99/293, 99/303
[51] Int. Cl. ....................................................... A47j 31/043
[58] Field of Search ................... 99/306, 307, 302, 303, 300

[56] References Cited

UNITED STATES PATENTS

| | | | |
|---|---|---|---|
| 2,856,843 | 10/1958 | Miklas | 99/306 |
| 3,077,156 | 2/1963 | Egi | 99/303 |
| 3,368,476 | 2/1968 | Mancioli | 99/293 |
| 3,413,910 | 12/1968 | Sanvitale | 99/303 |

Primary Examiner—Robert W. Jenkins
Attorney—McGlew & Tuttle

[57] ABSTRACT

Home coffeepot including a boiler, a coffee powder chamber with permeable upper and lower walls, a water rise passage extending downwardly from said chamber towards the boiler bottom, and a conduct extended upwardly for the outlet of the beverage formed by the hot water passing through the powder, the water being urged into said rise passage and into the conduct by steam pressure generated by heating of the boiler. A bell member is arranged in the boiler to set up a steam dome, wherein steam is continuously generated by heating; the rise passage extends with annular cross-section around this bell wherein the generated steam is discharged and rises together with the boiler's water.

6 Claims, 4 Drawing Figures

INVENTOR
LUCIANO MANCIOLI

By McGlew & Tuttle

BEVERAGE INFUSION APPARATUS, FOR EXAMPLE COFFEE

The object of the invention is a home coffeepot, of the type of including a boiler, a coffee powder chamber with permeable upper and lower walls, a water rise passage from the chamber towards the boiler bottom, and an outlet conduit for the beverage formed by the hot water passing through the powder. In these coffeepots, the water is urged into the rise conduit and upwardly in the conduit by the steam pressure generated with the heating of the boiler, and rises to be discharged in a jug container arranged above the boiler.

The invention relates to an improved coffeepot which has the purpose of improving the beverage in taste and flavor and of increasing the utilization of the coffee powder.

The coffeepot substantially includes a bell member arranged in the boiler to set up a steam dome, from which the steam continuously generated by the heating is discharged and rises in the riser passage together with the boiler's water.

In practice, the lower edge of the riser passage may be defined partly by the bell edge and partly by a wall defining the lower end of the riser conduit or passage with respect to the boiler cavity containing the water.

According to an advantageous embodiment, the bell is arranged coaxially within the water rise passage, which latter thus has an annular cross-section, at least in the lower initial portion, surrounding the bell.

According to a possible embodiment of the coffeepot, the bell is demountable from the structure forming the chamber lateral wall for the powder and the outer wall of the rise passage. Practically the coffeepot may then include, in the boiler interior, a tubular conduit having an upper end forming the side wall of the coffee powder chamber, an intermediate shoulder and a lower portion forming the outer wall of the water riser passage. The boiler interior may also contain an inner member forming the bell and disposed within such outer wall of the riser passage. A filter disk, which is seated on the shoulder, defines the lower limit of the powder chamber and an intake stem extends upwardly from the filter disk and is secured thereto and to the upper wall of the bell. This intake stem facilitates removal of the bell and lower filter disk from the tubular member, and its upper end contacts a permeable wall defining the upper end of the powder chamber. With this arrangement, the inner elements of the coffeepot are readily disengageable and removable for easy cleaning.

The invention also relates to an assembly designed to be accomodated in a home coffeepot, with the boiler closed by means of the coffee powder filter, and with a beverage rise conduit for the collection in an overlying jug, which assembly includes a bell member designed to be accomodated in the boiler to form a steam dome, and a second member designed to define with the bell member the water rise passage from the boiler, and at least partly the wall of the container for the coffee powder, this second member being provided with an intake lip for the engagement between coffeepot members. The assembly corresponds to that above defined.

The described arrangement allows to obtain firstly a utilization of the coffee powder —with the advantage of the beverage, smell contents— much higher than the conventional coffeepot. This is to be attributed to the presence of the bell and to the delivery of steam simultaneously with the liquid in the rise passage and in the powder chamber.

Another advantage obtained with the described arrangement is that of maintaining an efficient heating of the beverage during its transfer towards the collection container.

Still another advantage obtained with certain particular arrangements according to the invention, is that of an easy possibility of disassembling and thus of cleaning the different members.

These and other advantages and aims will result apparent from the specification which follows and which is referred to the drawings, which illustrate some possible but not restrictive embodiments of the invention.

IN THE DRAWINGS

DESCRIPTION OF THE PREFERRED EMBODIMENTS

Figure 1:
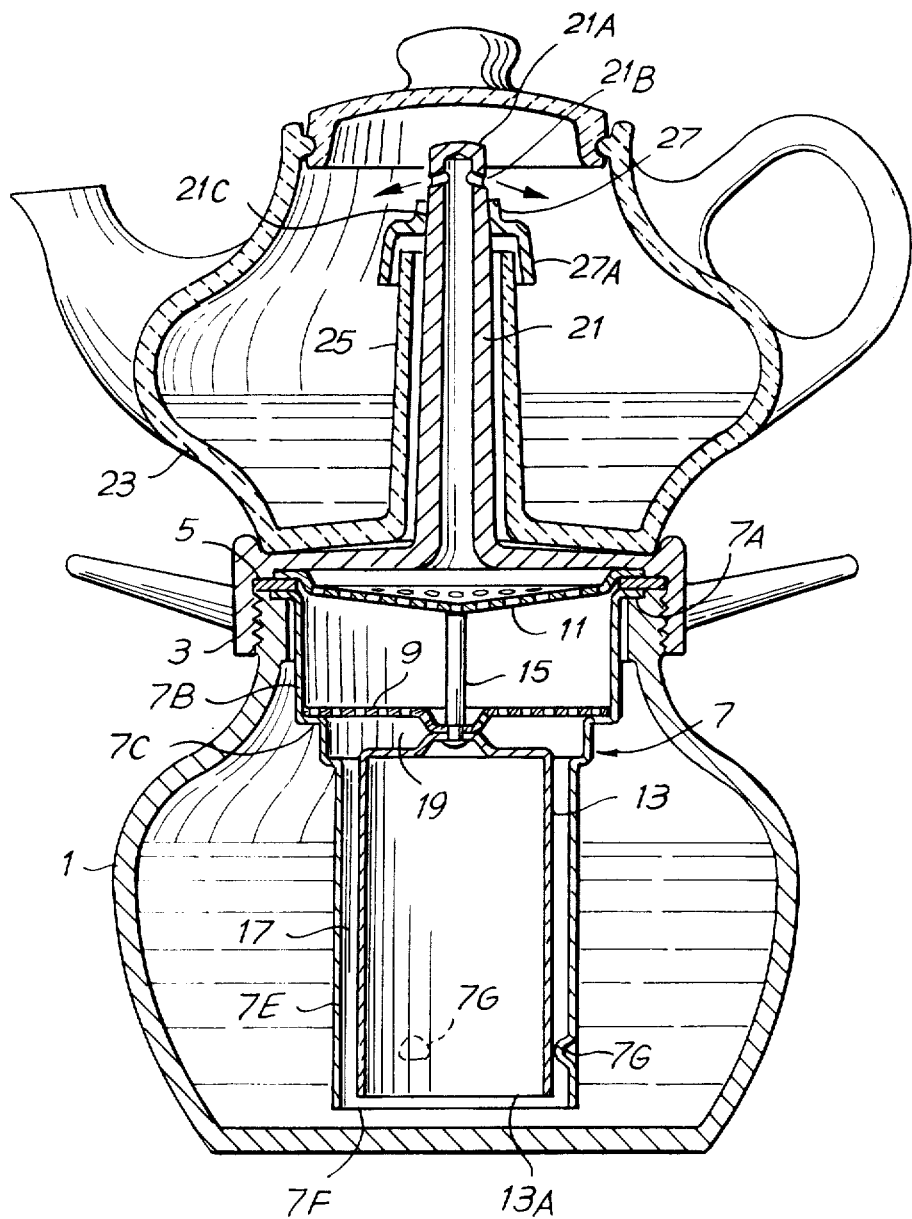
FIG. 1 illustrates an overall vertical section of an assembled coffeepot.
Figure 2:
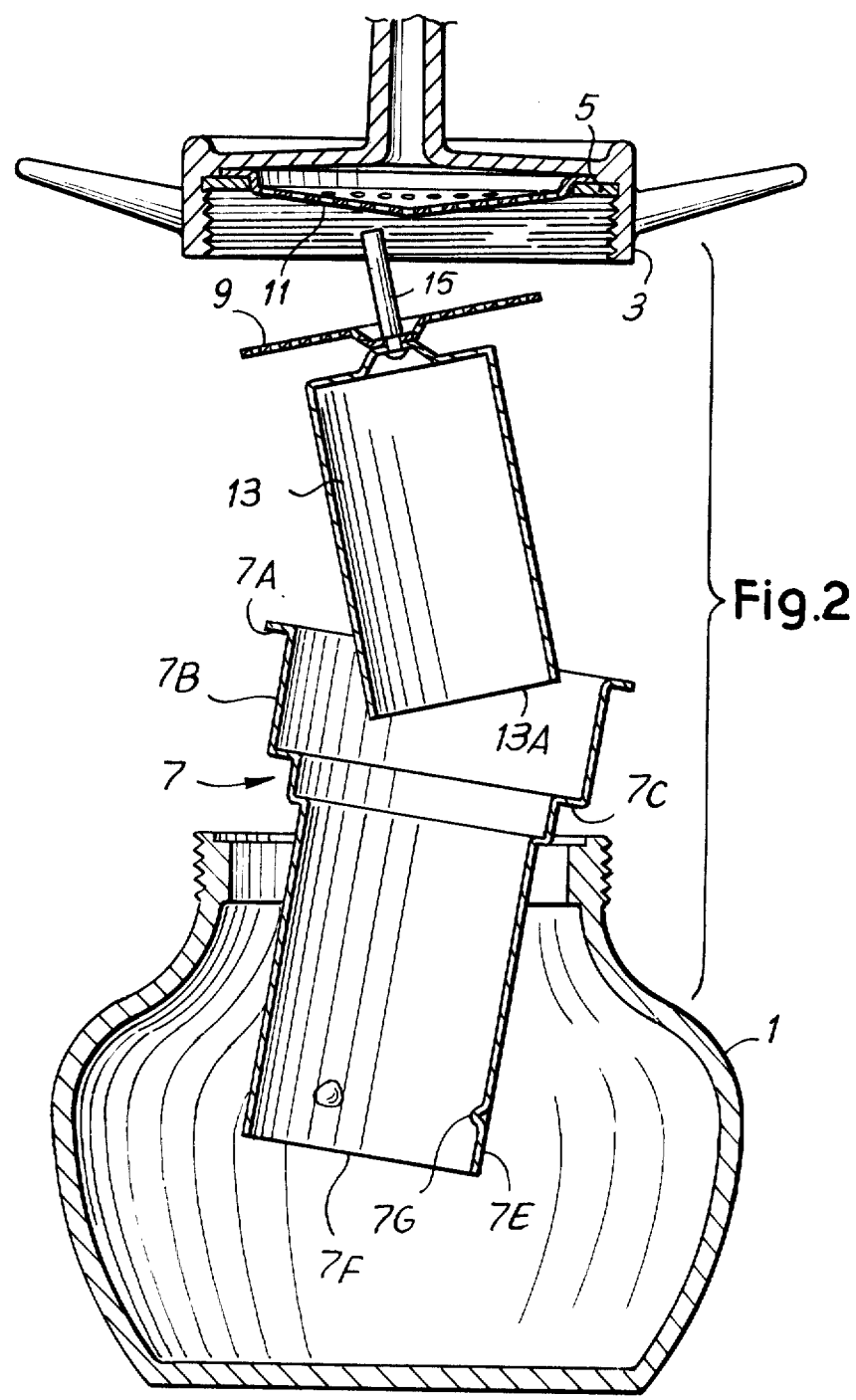
FIG. 2 illustrates some of the members shown in FIG. 1, still in section but disassembled.
Figure 3:
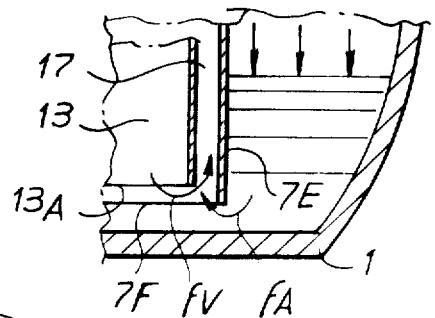
FIG. 3 illustrates a detail of FIG. 1.

According to what is shown in the accompanying drawing, and with a particular and initial reference to FIGS. 1 to 3, 1 denotes the boiler, to which a disc-like structure 3, forming a cover, may be secured by threading, sealing being assured by a packing 5. In the screw coupling between the parts 1 and 3 there is clampingly engaged the lip 7A of a tubular member 7, whose upper part forms the side wall 7B of the coffee powder chamber. The element 7 has an intermediate shoulder 7C and below the shoulder a cylindrical wall 7E which forms the outer wall of the water rise passage or the riser. When the lip 7A is engaged between the boiler 1 and the disc structure or cover 3, the lower edge 7F of the wall 7E of the member 7 is located at a restricted distance from the bottom of the boiler 1. A filter disc 9 may lie on the shoulder 7C and defines the lower end of coffee chamber. This chamber is limited at its upper end by an upper filter 11 engaged between the packing 7 and the disc structure 3, when the disc-like structure 3 is screwed to the boiler. A bell member 13 has an upper closed end wall secured centrally to filter disc 9 to extend downwardly therefrom, while an operational stem 15 is secured to filter disc 9 to extend upwardly therewith and is designed, during the assembly, to contact filter 11. The elements 9, 13, 15 are connected with one another in such a manner as to form a single unit capable of being introduced into the tubular member 7, making the disc 9 lie against the shoulder 7C, or respectively extracted or withdrawn from tubular member 7 for cleaning purposes. When the assembly 9, 13, 15 is introduced into the tubular member 7 and laid against the shoulder 7C, a gap 17 is defined between the bell 13 and the outer wall 7E, this gap representing the water rise conduct. The rise conduct leads into a collecting cavity 19 underlying the filter 9. Under the assembly conditions, as above defined, the edge 13A of the bell 13 is also located near the bottom of the boiler 1 and concentric to the edge 7F, to define the inner portion of the water rise conduct, having the annular cross-section represented by the gap 17. Suitable inner projections 7G of the wall 7E, or suitable outer projections in the wall of the bell 13 are designed for mutual centering. In the assembly by the screwing of the disc structure 3 onto the boiler 1, when the lip or flange 7A of the tubular member 7 is engaged between the boiler and the disc structure 3, and when the unit comprising the joined elements 9, 13 and 15 is inserted into member 7, stem 15 contacts filter or strainer 11 which is in the interior of the disc structure and is engaged beneath the upper end of the latter. In this way, the unit 9, 13, 15 is retained in the correct position for the contrast between the filter 11 and the shoulder 7C. The stem 15 is designed to facilitate the withdrawal of the unit 15, 9, 13 and withdrawal of the tubular member 7 from the boiler, besides facilitating the withdrawal of the assembly 15, 9, 13 from tubular member 7.

An upper small tube 21, extends upwardly from the disc structure 3 and is closed at the end at 21A and presents two side slits 21B for the mixture discharge. On the disc structure 3, a jug container 23 may be laid, designed to collect the infusion and capable of being freely raised from the disc structure. The bottom of the container 23 has a vertical tubular, upwardly tapered conduct 25. When the container 23 is laid on the disc structure 3, the conduct 25 accomodates the upper small tube 21, whose end projects above the upper edge of the conduct 25. This upper end of conduct 21 has a taper 21C, having an outer frustum-cone profile, which may cooperate with a through hole seat, having a corresponding frustum-cone profile, which is made in an annular element 27. This element is placed onto the small tube 21 and may rest on the frustum-cone taper 21C, setting up a seal against the penetration of the liquid between it and the frustum-cone taper 21C. The upper portion of element 27 is shaped with a chamfer for the beverage discharge, and the element has a lower enlargement 27A, like a shell, in such a manner as to embrace the upper end of the conduct 25 extending from the bottom of the container 23, when the container is laid on the disc structure 3. The beverage —being formed in the hereinafter described manner owing to the transit of the water through the powder contained in the chamber defined by the portions 7, 9, 11— rises in the small tube 21 and comes out from the slits 21B. The annular element 27 forms a protection against the penetration of the beverage in the gap between the small tube 21 and the conduct 25, and the beverage coming out of the small tube 21 is discharged thus directly into the container 23, being deviated by the annular element 27. When the jug container 23 is raised from the structure 3 and thus from the boiler, the annular element 27 is engaged and raised by the upper edge or rim of the conduct 25 and remains retained on the end of the this conduct, while the jug container 23 is operated to pour the beverage. Returning the jug container 23 onto the boiler and lying it on the structure 3, the upper small tube 21 penetrates again into the interior of the conduct 25 and is inserted into the frustum-cone seat of the annular element 27.

When the members 7, 13 and 15 are introduced into the boiler filled with water, the water level around the bell 13, and in particular around the wall 7E, is much higher than in the interior of the bell 13, where the water level is kept very near the edge 13A. The boiler is closed with the disc structure 3 after having introduced the coffee powder between the filtering walls 9 and 11. The heating generates steam arising from the water surface in bell 13, and the steam from the bell is discharged according to the arrow fV (FIG. 3) around the edge 13A to escape along the gap 17, through the powder contained between the two filters and into the upper conduct 21. The steam pressure simultaneously increases, by the effect of the heating, in the boiler interior around the wall 7E and thus the water is urged by pressure according to the arrow fA around the edge 7F also into the gap 17, to rise through the powder contained between the two filters 9 and 11 and into the upper conduct 21 to be discharged from the slits 21B into the jug container 23. Therefore both water and steam coming from the boiler 1 and from the bell 13 respectively transit through the coffee powder. The generation of the beverage is interrupted when the water level on the outside of the wall 7E is lowered beneath the edge 7F. The thrust which may be exerted by the inner pressure in the assembly 13, 9, 15 is exerted through the stem 15 onto the filter 11.

The exit of the water mixed with steam, together with the arrangement and use of the different structural portions here described, allow attaining the above indicated advantageous results.

According to a variation of this embodiment, it is also possible to lock the filter 9 onto the wall 7B. In this case, in particular (but also eventually in the illustrated solution) the stem may be eliminated.

Figure 4:
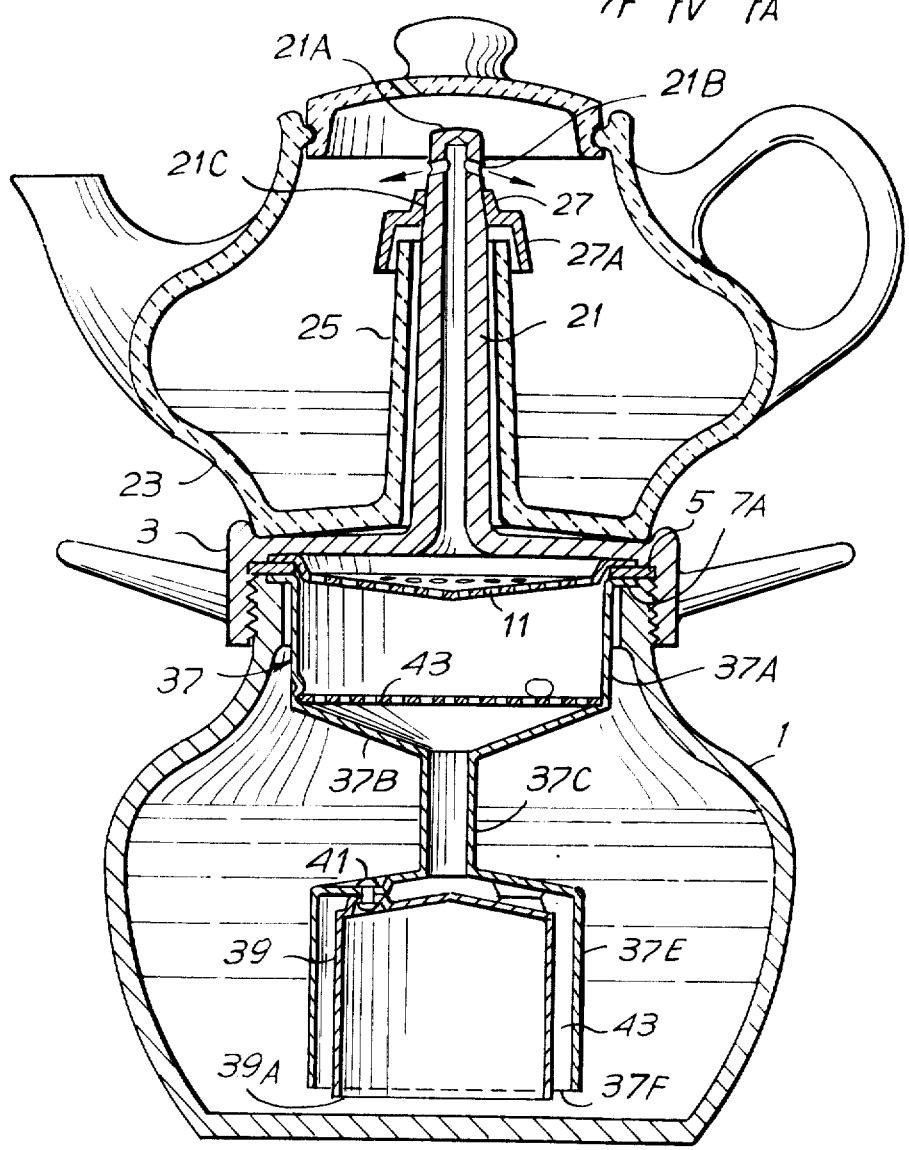
FIG. 4 illustrates a vertical section view similar to that of FIG. 1, shaving a variation of embodiment.

In the modified embodiment shown diagrammatically in FIG. 4, similar or corresponding members are indicated by the same reference numerals as used for the previous embodiment. According to this example, a member 37 corresponding to that denoted by 7 forms a lateral wall 37A for the coffee powder containing chamber, a lower hopper profile 37B, and a central small tube 37C which is enlarged downwardly to form a wall 37E ending with an edge 37F. In the interior of the enlarged section, a bell 39, having a lower terminal edge 39A, is accomodated, this bell being secured to the member 37 for instance by means of rivets 41 applied at projections formed by the bell and also by the member 37. A gap 43 is formed between the bell 39 and the wall 37E, this gap communicating with the small tube 37C. A filter 43, defining the lower end of the coffee powder chamber, is positioned at the juncture of the hopper profile 37B and the wall 37A. The edges 37F and 39A adjacent the boiler bottom are equivalent to the edges 7F and 13A of the previous embodiment. The gap 43 corresponds to the gap 17 of the preceding example, and forms the rise passage together with the small tube 37C and the hopper profile cavity 37B.

While specific embodiments of the invention have been shown and described in some detail to illustrate the application of the principles of the invention, it will be understood that the invention may be embodied otherwise without departing from such principles.

I claim:

1. A beverage infusion apparatus comprising, in combination, a first container adapted to contain a quantity of a fluid to be heated, and having an opening at its upper end; a cover forming a closure for said opening; a first conduit opening through said cover and extending upwardly therefrom from a filter wall; a second container adapted to be supported on said cover and having an opening to receive said first conduit for flow of fluid into said second container; a cup member, with a filtering bottom, adapted to be engaged between said first container and said cover at said filtering wall; a tubular member communicating with said cup member and forming a riser passage for fluid to rise from said first container toward said cup member, said tubular member having a lower end edge; and a bell member cooperating with said tubular member to form the riser passage, said bell member having a lower end edge cooperating with the lower end edge of said tubular member to define the lower end edge of said riser passage; whereby, hot fluid from said first container and steam generated in said bell are adapted to flow upwardly in said riser passage toward said filtering bottom of said cup member.

2. A beverage infusion apparatus comprising, in combination, a first container adapted to contain a quantity of a fluid to be heated, and having an opening at its upper end; a cover forming a closure for said opening; a first conduit opening through said cover and extending upwardly from said cover from a filter wall; a second container adapted to be supported on said cover and having an opening to receive said first conduit for supplying fluid to said second container; a cup member, with a lower filtering bottom, engageable between said first container and said cover, at said filtering wall; a circular cross-section wall extending downwardly from said cup member into said first container, with at least a portion of said circular cross-section wall constituting a cylindrical wall having a lower end edge; and a bell member positioned inside said cylindrical wall and having a lower edge concentric to the lower edge of said cylindrical wall; said bell member and said cylindrical wall conjointly defining a riser passage for upward flow of hot fluid, from said first container, and steam generated in said bell, toward said filtering bottom of said cup member.

3. A beverage infusion apparatus comprising, in combination, a first container adapted to contain a quantity of a fluid to be heated, and having an opening at its upper end; a cover forming a closure for said opening; a first conduit opening through said cover and extending upwardly from said cover from a filter wall; a second container adapted to be supported on said cover and having an opening to receive said first conduit for supply of fluid to said second container; a tubular member positionable in said first container and engageable between said first container and said cover; said tubular member having an upper portion forming a side wall defining a chamber for the coffee powder, an intermediate shoulder, and a lower cylindrical wall having a lower end edge; and an inner removable member insertable into said tubular member and including a bell positionable within said cylindrical wall to define therewith a riser passage, a filter disk adapted to rest on said shoulder and defining the bottom wall of said powder chamber, and a stem extending upwardly from said filter disk and forming a handle for removing said inner member from said tubular member; said stem, during assembly of the parts, contacting said filtering wall.

4. A beverage infusion apparatus, as claimed in claim 3, in which said cylindrical wall is relatively elongated; said bell having an elongated cylindrical wall and a closed upper end secured by said stem to said filter disk; the lengths of said cylindrical walls of said tubular member and said bell being such that the lower ends thereof are spaced only a short distance from the bottom of said first container, when the parts are assembled.

5. A beverage infusion apparatus, as claimed in claim 3, in which said intermediate shoulder is defined by the junction of said chamber-defining side wall and a hopper-shaped portion of said tubular member, said hopper-shaped portion opening into a relatively small diameter tubular conduit continued as a radially outwardly extending and downwardly sloping wall terminated by said cylindrical wall; said bell having a closed upper end secured to said radially outwardly extending and downwardly sloping wall at spaced points to provide a passage therebetween connecting said riser passage to said small diameter tubular conduit.

6. An assembly designed for use with a coffeepot of the type including a first container adapted to contain a quantity of fluid to be heated, and having an opening at its upper end, a cover forming a closure for the opening, a first conduit opening through the cover and extending upwardly from the cover from a filter wall, and a second container adapted to be supported on the cover and having an opening to receive the first conduit to supply fluid to the second container; said assembly comprising, in combination, a tubular member having an upper lip engageable between said first container and said cover, and having an upper portion forming a side wall defining a chamber for coffee powder, an intermediate shoulder, and a lower cylindrical wall portion having a lower end edge; and an inner removable member including a bell adapted to be positioned within said cylindrical wall to define therewith a riser passage, a filter disk adapted to rest on said shoulder to define the bottom of said powder chamber, and a stem extending upwardly from said filter disk and forming an operational means for removal of said inner member from said tubular member.

* * * * *